United States Patent [19]

Voller

[11] Patent Number: 4,860,410
[45] Date of Patent: Aug. 29, 1989

[54] CAM ACTION FASTENER

[76] Inventor: Ronald L. Voller, 1375 Williamsburg Dr., Schaumburg, Ill. 60172

[21] Appl. No.: 171,849

[22] Filed: Mar. 22, 1988

[51] Int. Cl.⁴ ............................................. F16B 13/04
[52] U.S. Cl. ..................................... 24/297; 24/453; 411/548
[58] Field of Search ................... 24/297, 326, 453; 403/252; 248/73; 411/548, 57

[56] References Cited

U.S. PATENT DOCUMENTS

| | | | |
|---|---|---|---|
| 2,143,603 | 1/1939 | Lombard | 24/453 |
| 2,238,463 | 4/1941 | Dubilier | 411/548 |
| 3,130,822 | 4/1964 | Meyer | 24/297 |
| 4,143,577 | 3/1979 | Eberhardt | 411/548 |
| 4,176,428 | 12/1979 | Kimura | 411/57 |
| 4,185,800 | 1/1980 | Kabel | 248/73 |
| 4,493,580 | 1/1985 | Ruehl | 403/252 |
| 4,517,711 | 5/1985 | Tanaka | 24/453 |
| 4,524,494 | 6/1985 | Sato et al. | 24/297 |
| 4,637,765 | 1/1987 | Omata | 411/57 |

FOREIGN PATENT DOCUMENTS 2201058 7/1973 Fed. Rep. of Germany ...... 411/548

Primary Examiner—Victor N. Sakran
Attorney, Agent, or Firm—Robert A. Brown

[57] ABSTRACT

A cam action fastener for holding together two parts having holes formed therethrough by inserting the fastener through the holes from one side only of one of the parts. The fastener is formed from a single, elongate member having two outer portions equal in length and an intermediate portion having a length substantially shorter than the length of the two outer portions and connecting them together. The fastener is adaptable to be articulated into a doubled over shape having two unequal lengths of a single diameter for fitting through the holes of the two parts.

The fastener is pressed against the outermost part in a manner that causes the unequal lengths to diverge outwardly from each other by cam action rotation of the intermediate portion of the fastener to a point where the two outer portions are spaced a distance from each other equal to the length of the intermediate portion of the fastener.

The fastener is adaptable to be removed from the parts by pulling outwardly on one of the two outer portions which causes the intermediate portion to collapse, break the toggle lock, reverse the cam action rotation and form two unequal lengths having a single cross sectional shape to facilitate removal of the fastener from the openings of the two parts.

17 Claims, 1 Drawing Sheet

U.S. Patent   Aug. 29, 1989   4,860,410
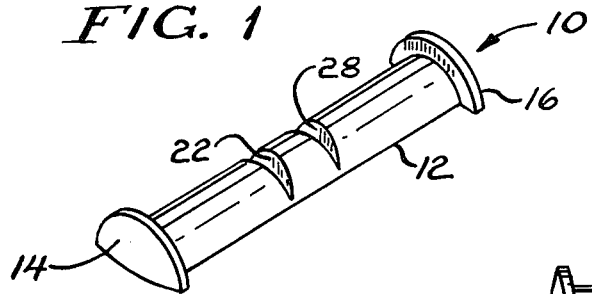
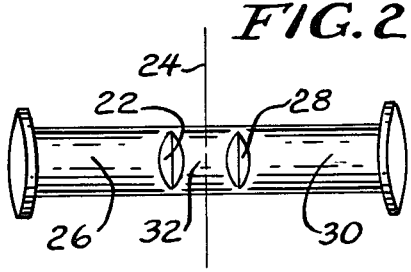
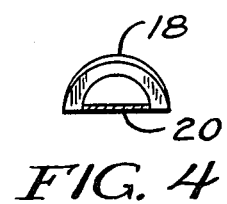
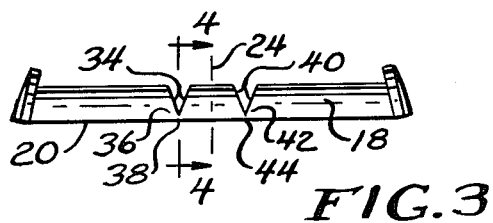
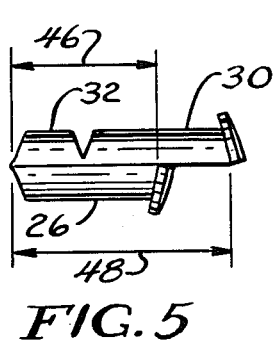
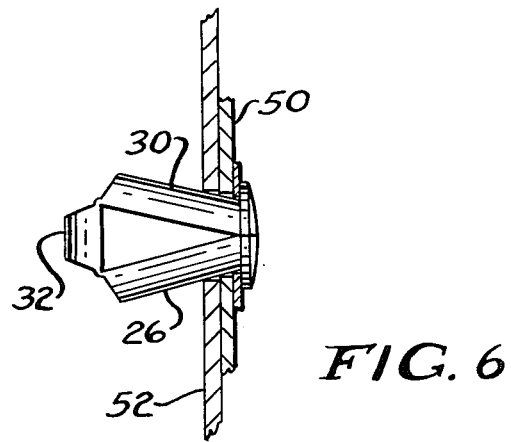

CAM ACTION FASTENER

BACKGROUND OF THE INVENTION

The present invention relates generally to detachable fasteners and more particularly to a single member, doubly articulated, cam action fastener which may be manipulated into and out of holding engagement with openings of different sizes and shapes disposed in panels, walls, abutting surfaces of varying thicknesses or maintain thereagainst a surface mounted device such as a hanger, hook, strap holder, or the like.

DESCRIPTION OF THE PRIOR ART

Fastening, retaining and support devices of the prior art generally require a number of separate operations in order to be installed and/or removed from panels or other like articles to which they are affixed or installed. Also, usually there are two or more pieces that require assembly either before or after installation. In addition, many prior art fastening devices cannot be removed from a panel or other work piece without damaging either the work or the device or both.

Past attempts to solve the basic problem of fastening, retaining and support devices are illustrated in U.S. Pat. Nos. 3,130,822; 4,143,577; 4,176,428; 4,185,800; 4,493,580; 4,517,711 and 4,524,494. For the most part all of these references disclose clips, clamps, prongs, arms, male and female members and other like structures, but none succeeds in providing a single member, doubly articulated, cam action fastening device as disclosed herein.

SUMMARY OF THE INVENTION

Accordingly, it is a primary object of the present invention to provide an improved detachable fastening device that can be easily installed in and removed from an opening or an aperture located in a panel.

Another object of the present invention is to provide an improved detachable fastening device that is effective to hold in assembled relationship two or more panels having varying thicknesses and apertures or openings of any geometrical shape formed therethrough of different sizes.

An additional object of the present invention is to provide an improved detachable fastening device that is foldable into a single member adaptable for insertion and removal from any size or shape of opening formed through panels, walls or other like surfaces abutting one another.

A further object of the present invention is to provide an improved detachable fastening device that can be easily inserted and removed by simple manipulation from any size or shape of opening in a panel to which it has been attached.

An improved detachable fastening device constructed in accordance with the present invention comprises a single elongate member having a first flange formed at one end and a second flange formed at its other end, the member being formed in the shape of a half cylinder, the member having a first notch disposed slightly outwardly from a midpoint thereof toward the first flange, the member having a second notch disposed slightly outwardly from the midpoint toward the second flange, the first and second notches being at times effective to form a hinged joint of articulation, the member when doubled about either the first or second notch being adaptable to assume a full cylindrical shape for a pre-determined length and to maintain a half cylindrical shape for an additional length, the full cylindrical shape being adaptable for insertion into an opening and thereafter cause the hinged joint of each notch to spread apart the full cylindrical shape into two separate half cylinders whereby the device is fixedly secured in the opening.

BRIEF DESCRIPTION OF THE DRAWING

The foregoing and other characteristics, objects, features and advantages of the present invention will become more apparent upon consideration of the following detailed description, having reference to the accompanying figures of the drawing, wherein:

FIG. 1 is a perspective view of an improved fastening device of the invention showing a single, one-piece elongate member having flanged outer end portions connected by an intermediate portion.

FIG. 2 is a top plan view of the fastening device shown in FIG. 1.

FIG. 3 is a side elevational view of the fastening device shown in FIG. 1 indicating the manner in which notch portions divide the elongate member into two outer end portions and an intermediate connecting portion therebetween.

FIG. 4 is an end sectional view taken along the lines 4—4 of FIG. 3 showing details of a notch portion of the fastening device.

FIG. 5 is a side elevational view of the fastening device showing the single elongate member articulated or doubled over into two portions of unequal length.

FIG. 6 is a side elevational view of the fastening device showing the two outer end portions diverged outwardly from each other, held thereat by the intermediate connecting portion and thereby securing together two dissimilar articles or parts.

DESCRIPTION OF A PREFERRED EMBODIMENT

Now referring to the several figures of the drawing, wherein corresponding parts are identified by like reference numerals, a cam action fastening device, generally identified by reference numeral 10, comprises an elongate, flexible member 12 having disposed at a first outer end a semi-spherical, first, flange or stop member 14 and at a second outer end, a second, semi-spherical, flange or stop member 16. The elongate member 12, as best seen in FIG. 4 in cross section is preferably formed in the shape of a hemisphere having an outer circumferential surface 18 and a flat bottom surface 20. A first notch or recess portion 22 is formed in circumferential surface 18 at a position slightly outwardly from a midpoint 24 of the elongate member 12. The distance between the first flange 14 and the first notch 22 defines a first outer portion 26 of the elongate member 12.

A second notch or recess portion 28 is formed in circumferential surface 18 at a point slightly outwardly from the midpoint 24 toward the second flange 16. The distance between the second flange 16 and the second notch 28 defines a second outer portion 30 of the elongate member 12. Disposed between and connecting the first outer portion 26 to the second outer portion 30 is an intermediate portion or member 32.

Referring now in detail to the first notch 22, it will be seen that side surfaces 34 thereof converge inwardly from the circumferential surface 18 to meet at an apex 36 to form a first narrow neck portion 38. Similarly, the second notch 28 includes side surfaces 40 that converge inwardly from the circumferential surface 18 to meet at an apex 42 to form a second narrow neck portion 44. It will be readily understood that the first neck portion 38 and the second neck portion 44 make it possible for the flexible member 12 to bend, fold over or articulate about either or both neck members 38 and 44 and thereby comprise thereat what might be termed "living hinges".

With specific reference to FIG. 5, it will be seen that elongate member 12 has been folded over and about first neck portion or hinge member 38 so that the flat surface 20 of first outer portion 26 is flush against the flat surface 20 of the second outer portion 30. The fastening device 10 now includes a doubled over shape that comprises two unequal lengths, a first length 46 being equal to that of first outer portion 26 and a second length 48 being equal to the combined lengths of intermediate member 32 and second outer portion 30. The member 12 when placed in a folded over position about either of hinges 38 and 44 is effective to provide an end member section having a preferably circular configuration of a predetermined diameter adaptable for insertion through apertures of articles for fastening there-together. It should be understood that the device 10, while shown as a solid, half cylindrically shaped member 12, may be formed from any desired geometrical configuration in cross section, such as a solid, square, rectangular or multi-sided polyhedron, or any combination of inner and outer circumferential or peripheral surfaces forming a hollow tube member or a hollow square, rectangular or multi-sided polyhedron shaped member.

In joining separate articles to each other, a hole or aperture in each article is aligned one to the other so as to provide substantially a single opening through the two articles. A folded over flexible member 12, such as shown in FIG. 5, with either hinge member 38 or 44 leading the way, is inserted through the opening. The member 12 will continue to move through the opening until an inner surface of the first flange 14 abuts an exterior surface of a first article 50 (as seen in FIG. 6). Continued pressure is exerted against the second flange 16, which causes the first outer portion 26 to bend downwardly and simultaneously causes the second outer portion 30 to bend upwardly. The downward bending of first outer portion 16 and the upward bending of second outer portion 30 causes intermediate member 32 to rotate counter clockwise about both first hinge 38 and second hinge 44. The downward movement of first outer portion 26, the upward movement of second outer portion 30 and the counter clockwise rotation of intermediate member 32 continue until the intermediate member 32 is substantially upright, in a vertical attitude, or positioned so that its flat surface 20 is substantially parallel to an inside surface of a second article 52 (as seen in FIG. 6). It will be understood that the final assembled position of intermediate member 32 may be in any orientation or attitude within 360 degrees about the opening, so long as its flat surface remains substantially parallel to an inner surface of the second article 52.

As shown in FIG. 6, the device is effective to join together two panels, but it should be noted the device is adaptable to attach a single article to a panel or wall by inserting the device through an opening in the article, placing the device into an opening in the panel or wall and thereafter cause the device to expand inwardly of the panel or wall and thereby secure the article thereto.

Also, as shown in FIG. 6, the device when in its locked position, assumes a position of orientation wherein the intermediate member 32 has its longitudinal axis or respective flat bottom surface 20 substantially perpendicular to a longitudinal axis that bisects the angle of divergence between the first outer portion 26 and the second outer portion 30.

Further, the first flange 14 and the second flange 16 cooperate to act as positive stop members to ensure that the intermediate member 32 snaps or rotates in a cam action manner so as to separate and spread apart first 26 and second 30 outer portions a distance equal to the length of member 32 and thereby place the device 10 in a locked or secure position.

When it is desired to remove the member 12 from its secured position, either the first flange 14 or the second flange 16 is pulled outwardly, which reverses the hereinabove described downward movement of first outer portion 26, the upward movement of second outer portion 28 and the toggle lock, cam action counter clockwise rotation of intermediate member 32. Thus, as a flange is pulled outwardly, the first 26 and second 28 outer portions move toward each other and intermediate member 32 rotates about hinge members 38 and 44. These movements continue until intermediate member 32 collapses so as to form a doubled up member as illustrated in FIG. 5. It is then possible to withdraw the fastener device 10 from the attached articles 50 and 52 and thereby separate them from each other.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An improved detachable fastening device comprising a single elongate member having first flange means formed at one end and second flange means formed at its other end, said member being formed in the shape of a half cylinder and having first notch means disposed slightly outwardly from a midpoint thereof toward said first flange, said member having second notch means disposed slightly outwardly from said midpoint toward said second flange means, said first and second notch means being at times effective to form a separate, respective hinged joint of articulation, said member when doubled about either said first or second notch means being adaptable to assume a full cylindrical shape for a predetermined length and to maintain a half cylindrical shape for an additional length, said full cylindrical shape being adaptable for insertion into an opening and thereafter effective to cause the hinged joint of said first and second notch means to spread apart said full cylindrical shape into two separate half cylinders whereby the device is fixedly secured in the opening.

2. A fastening device as claimed in claim 1 wherein movement of either of said two separate half cylinders in a direction outwardly from said opening is effective to collapse said two half cylinders, into said full cylindrical shape for removal of said device from said opening.

3. A fastening device as claimed in claim 1 wherein said predetermined length of said full cylindrical shape is greater than said additional length of said half cylindrical shape.

4. A fastening device as claimed in claim 1 wherein said first and said second notch means are formed having inclined planes converging inwardly to form respective thin wall means on a flat side portion of said member.

5. A fastening device as claimed in claim 1 wherein a length of said member measured from said first flange means to said first notch means is equal to a length of said member measured from said second flange means to said second notch means.

6. A fastening device as claimed in claim 5 wherein a length of said member measured between said first and said second notch means is less than said length of said first flange means to said first notch means.

7. A fastening device as claimed in claim 6 wherein said two separate half cylinders are spaced apart a distance equal to said length of said member measured between said first and said second notch means.

8. An improved detachable fastening device comprising a single elongate member having first stop means formed at one end and second stop means formed at its other end, said member having first recess means disposed slightly outwardly from a midpoint thereof toward said first stop means, said member having second recess means disposed slightly outwardly from said midpoint toward said second stop means, said first and second recess means being at times effective to form separate, respective hinged joints of articulation, said member when doubled about either said first or second recess means being adaptable to form a first portion thereof having a predetermined length and to form a second portion thereof having an additional length, the said first portion of said member being adaptable for insertion into an opening and thereafter being effective to cause said hinged joints of said first and second recess means to spread apart said first portion of said member into two separate sections whereby the device is fixedly secured in the opening.

9. A fastening device as claimed in claim 8 wherein movement of either of said first and said second portions of said member in a direction outwardly from said opening is effective to collapse said first and said second portions into a single shape for removal of said device from said opening.

10. A fastening device as claimed in claim 8 wherein said predetermined length of said first portion of said member is greater than said additional length of said second portion of said member.

11. A fastening device as claimed in claim 8 wherein said first and said second recess means are formed having inclined planes converging inwardly to form respective thin wall means on a flat side portion of said member.

12. A fastening device as claimed in claim 8 wherein a length of said member measured from said first stop means to said first recess means is equal to a length of said member measured from said second stop means to said second recess means.

13. A fastening device as claimed in claim 12 wherein a length of said member measured between said first and said second recess means is less than said length of said first stop means to said first recess means.

14. A fastening device as claimed in claim 13 wherein said two separate sections are spaced apart a distance equal to said length of said member measured between said first and said second recess means.

15. A single piece cam action fastener comprising an elongate member having a first outer circumferential surface shaped semicircular in cross section, having a second flat outer surface forming a plane of intersection with said semi circular cross section along a diameter thereof,
- a first semi-circular flange having a predetermined thickness disposed on a first distal end of said member,
- a second semi-circular flange having a predetermined thickness disposed on a second distal end of said member,
- a first notch portion formed in said outer circumferential surface slightly outwardly toward said first distal end adjacent to a midpoint of said elongate member, said first notch portion having side surfaces forming inclined planes converging inwardly from said outer circumferential surface to form a first truncated apex in said member at a point slightly less than a point of intersection with said plane of said flat outer surface so as to form a thin wall section having a flat surface substantially parallel to said plane of said flat outer surface,
- a second notch portion formed in said outer circumferential surface at a position slightly outwardly toward said second distal end adjacent to said midpoint of said elongate member,
- said second notch portion having side surfaces forming inclined planes converging inwardly from said outer circumferential surface to form a second truncated apex in said member at a point slightly less than a point of intersection with said plane of said flat outer surface so as to form a thin wall section having a flat surface substantially parallel to said plane of said flat outer surface,
- said first distal end being formed in a shape of an elongate section substantially semi-circular in cross section extending from said first flange inwardly toward said first portion for a predetermined length,
- said second distal end being formed in the shape of an elongate section substantially semi-circular in cross section extending from said second flange inwardly toward said second notch portion for a predetermined length, and
- one of said first and said second ends being adaptable to bend about one of said first or said second truncated apexes to form a cylindrically shaped member having a first end portion,
- said cylindrically shaped member being adaptable for insertion into an opening and thereafter cause said first and said second truncated apexes to spread apart from each other and thereby fixedly secure said fastener in said opening.

16. A method for fastening and unfastening two separate articles including a fastening device comprising a single elongate member having first stop means formed at one end and second stop means formed at its other end, said member having first recess means disposed slightly outwardly from a midpoint thereof toward said first stop means, said member having second recess means disposed slightly outwardly from said midpoint toward said second stop means, said first and said second recess means being at times effective to form separate joints of articulation, comprising the steps of bending said member about one of said recess means to form a first portion thereof having a predetermined length, and a second portion thereof having an additional length, inserting said first portion of said member into aligned openings of said articles, continuing to insert said first portion of said member until one of said stop means contacts an outer side of one of said articles, and forcing inwardly said second portion of said member until the other stop means contacts said outer side of said one of said articles, whereby said first and said second portions of said member are spread apart a distance greater than a size of said openings and fixedly secure said device therein.

17. A method as claimed in claim 16 comprising the steps of retracting one of said first and said second portions of said member so as to collapse said member into unequal lengths, and removing said member from said openings.

* * * * *